US010576993B2

(12) United States Patent
Yoon

(10) Patent No.: US 10,576,993 B2
(45) Date of Patent: Mar. 3, 2020

(54) APPARATUS, METHOD AND SYSTEM FOR PROVIDING VOICE OUTPUT SERVICE IN VEHICLE

(71) Applicants: Hyundai Motor Company, Seoul (KR); Kia Motors Corporation, Seoul (KR)

(72) Inventor: Hyun Jin Yoon, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/995,490

(22) Filed: Jun. 1, 2018

(65) Prior Publication Data

US 2019/0176845 A1 Jun. 13, 2019

(30) Foreign Application Priority Data

Dec. 13, 2017 (KR) .................. 10-2017-0171646

(51) Int. Cl.
| *B60W 40/08* | (2012.01) |
| *B60W 50/14* | (2020.01) |
| *G06K 9/00* | (2006.01) |
| *G10L 17/00* | (2013.01) |
| *G06F 3/16* | (2006.01) |

(52) U.S. Cl.
CPC ............. *B60W 50/14* (2013.01); *G06F 3/167* (2013.01); *G06K 9/00268* (2013.01); *G06K 9/00288* (2013.01); *G06K 9/00832* (2013.01); *G06K 9/00845* (2013.01); *G10L 17/005* (2013.01)

(58) Field of Classification Search
CPC ............. B60W 50/14; G06K 9/00268; G06K 9/00288; G06K 9/00832; G06K 9/00845; G10L 17/005; G06F 3/107
USPC ..... 340/460, 439, 457, 425.5, 438, 575, 576
See application file for complete search history.

(56) References Cited

U.S. PATENT DOCUMENTS

| 2010/0262469 A1* | 10/2010 | Fein .................... G06Q 30/0244 340/995.24 |
| 2015/0307106 A1* | 10/2015 | Rao ........................ B60W 40/09 701/29.1 |
| 2015/0328985 A1* | 11/2015 | Kim .................... H04N 5/23229 180/272 |
| 2016/0039424 A1* | 2/2016 | Hong .................... B60W 40/08 701/2 |
| 2016/0098992 A1 | 4/2016 | Renard et al. |
| 2017/0267251 A1* | 9/2017 | Roberts ................ B60W 40/08 |

FOREIGN PATENT DOCUMENTS

| JP | 2015079237 A | 4/2015 |
| KR | 20150034838 A | 4/2015 |

* cited by examiner

*Primary Examiner* — Brent Swarthout
(74) *Attorney, Agent, or Firm* — Mintz Levin Cohn Ferris Glovsky and Popeo, P.C.; Peter F. Corless

(57) ABSTRACT

An apparatus for providing a voice output service in a vehicle can include: a controller configured to detect whether a driver enters the vehicle, determine a recommended function for the driver based on information of the driver and information of a state of the vehicle when it is detected that the driver enters the vehicle, and generate a voice output service message for informing the driver of the recommended function; and an output device configured to output the generated voice output service message.

20 Claims, 6 Drawing Sheets

APPARATUS, METHOD AND SYSTEM FOR PROVIDING VOICE OUTPUT SERVICE IN VEHICLE

CROSS-REFERENCE TO RELATED APPLICATION

This application is based on and claims the benefit of priority to Korean Patent Application No. 10-2017-0171646, filed on Dec. 13, 2017 in the Korean Intellectual Property Office, the disclosure of which is incorporated herein in its entirety by reference.

TECHNICAL FIELD

The present disclosure relates to an apparatus, a method, and a system for providing a voice output service in a vehicle, and more particularly to an apparatus, a method, and a system for providing a voice output service in a vehicle, capable of providing a voice output service message for actively informing a function useful to a driver based on the state of a vehicle and the information on a driver.

BACKGROUND

The recent development of multi-media technology and information technology has increased the comfort and convenience of vehicles through providing infotainment for the driver. In addition, an increasing number of devices are being operated by drivers and a greater amount of information has been required from components of the vehicle due to the complexity and various running patterns of the vehicle. In addition, the types of information to be provided for the driver vary greatly in the form of sound, text, graphics, or images.

Modern vehicles typically include various types of convenience devices, such as a vehicle audio/video system or a vehicle navigation system for providing map information or traffic information. For instance, an audio, video & navigation (AVN) system integrating an audio system, a video system, and a navigation system, and including a terminal, is able to communicate with the components of the vehicle. The AVN system may output various forms of information including driving-related information, location and map information, or media (audio or video) information in the form of audio or images to be provided for the driver.

Conventionally, voice recognition functions have included making a call through voice input or controlling various operations of a terminal, among other functions of a mobile communication terminal. Voice recognition technology generally refers to a technology of recognizing a voice signal of a human being using a computing device (e.g., computer) to detect underlying linguistic information, and performing action corresponding to the detected command. For example, a call can be made automatically when a voice is input into a mobile communication terminal if contacts, such as a phone number, are stored in a memory of the mobile communication terminal.

Such voice recognition functions have been partially applied to a vehicle. Recently, as the need for driver information has increased, a voice recognition module has been linked to a vehicle terminal allowing a driver to request information by voice. The vehicle terminal provides information requested by the driver according to the voice request of the driver which is recognized through the voice recognition module. However, the information provided is limited only to the specific information requested by the driver. That is, the conventional voice recognition systems do not proactively provide functions predicted to be useful to the driver.

SUMMARY

The present disclosure has been made to solve the above-mentioned problems occurring in the related art while advantages achieved by the prior art are maintained intact.

An aspect of the present disclosure provides an apparatus, a method, and a system for providing a voice output service in a vehicle, capable of actively recommending a function useful to a driver.

The technical problems to be solved by the present disclosure are not limited to the aforementioned problems, and any other technical problems not mentioned herein will be clearly understood from the following description by those skilled in the art to which the present disclosure pertains.

According to embodiments of the present disclosure, an apparatus for providing a voice output service in a vehicle can include: a controller configured to detect whether a driver enters the vehicle, determine a recommended function for the driver based on information of the driver and information of a state of the vehicle when it is detected that the driver enters the vehicle, and generate a voice output service message for informing the driver of the recommended function; and an output device configured to output the generated voice output service message.

In addition, the apparatus can further include a camera which captures a facial image of the driver and a surrounding image of the vehicle.

In addition, the apparatus can further include a sensor configured to sense the state of the vehicle.

In addition, the controller can detect that the driver enters the vehicle when a communication device of the vehicle is connected with a personal device of the driver.

Further, the controller can detect that the driver enters the vehicle when at least one of a facial image of the driver or a voice of the driver is recognized.

In addition, the controller can share the information of the driver and the information of the state of the vehicle with a cloud server.

In addition, the controller can select a domain using the information of the driver and the information of the state of the vehicle; generate the voice output service message within the domain; and determine whether reference information for generating the voice output service message is acquired.

Further, the controller can generate the voice output service message when the reference information for generating the voice output service message is acquired.

In addition, the controller can generate a message for obtaining the reference information when the reference information for generating the voice output service message is not acquired.

Furthermore, according to embodiments of the present disclosure, a method for providing a voice output service in a vehicle can include: detecting whether a driver enters the vehicle; determining a recommended function for the driver based on information of the driver and information of a state of the vehicle when it is detected that the driver enters the vehicle; generating a voice output service message for informing the driver of the recommended function; and outputting the generated voice output service message.

In addition, the detecting of whether the driver enters the vehicle can include detecting that the driver enters the vehicle when a communication device of the vehicle is connected with a personal device of the driver.

In addition, the detecting of whether the driver enters the vehicle can include detecting that the driver enters the vehicle when at least one of a facial image of the driver or a voice of the driver is recognized.

Further, the detecting of whether the driver enters the vehicle can include acquiring the information of the driver; and sensing the state of the vehicle using a sensor.

In addition, the acquiring of the information of the driver can include acquiring the information of the driver from a camera provided in the vehicle and a personal device of the driver connected with a communication device of the vehicle.

In addition, the sensing of the state of the vehicle can include sensing a driving state of the vehicle, a setting state of the vehicle, and a surrounding state of the vehicle.

Further, the determining of the recommended function can include selecting a domain based on the information of the driver and the information of the state of the vehicle.

In addition, the generating of the voice output service message can include determining whether a requirement information reference value for generating the voice output service message within the domain is acquired.

In addition, the generating of the voice output service message can further include generating the voice output service message when the requirement information reference value for generating the voice output service message is acquired.

In addition, the generating of the voice output service message can further include generating a message for obtaining information when the requirement information reference value for generating the voice output service message is not acquired.

Furthermore, according to embodiments of the present disclosure, a system for providing a voice output service in a vehicle can include: an apparatus for providing a voice output service in the vehicle; and a cloud server in communication with the apparatus. The apparatus can include a controller configured to detect whether a driver enters the vehicle, determine a recommended function for the driver based on information of the driver and information of a state of the vehicle, which are shared with the cloud server, when it is detected that the driver enters the vehicle, and generate a voice output service message for informing the driver of the recommended function; and an output device configured to output the generated voice output service message.

BRIEF DESCRIPTION OF THE DRAWINGS

The above and other objects, features and advantages of the present disclosure will be more apparent from the following detailed description taken in conjunction with the accompanying drawings.

Figure 1:
FIGS. 1 and 2 are schematic views illustrating a system for providing a voice output service, according to the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In the following description, the same reference numerals will be assigned to the same elements even though the elements are illustrated in different drawings. In addition, in the following description, a detailed description of well-known features or functions will be ruled out in order not to unnecessarily obscure the gist of the present disclosure.

In the following description of elements according to an embodiment of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The present disclosure relates to a technology of generating a voice output service message for proactively determining and providing a recommended function for a driver based on information of the driver and information of a state of the vehicle by generating a voice output service message for informing the driver of the recommended function, when it is detected that the driver enters the vehicle.

According to embodiments the present disclosure, the voice output service message may be provided for the driver directly or depending on the selection by the driver according to the need. Even if the driver does not input a separate command to execute a desired function after boarding the vehicle, the driver may receive the function actively recommended inside the vehicle or may not receive the function if the driver does not want the function. Therefore, a customized voice output service may be provided for the driver.

FIG. 1 is a schematic view illustrating the system for providing the voice output service, according to the present disclosure.

As illustrated in FIG. 1, according to the present disclosure, if it is determined that the driver gets in (i.e., enters) the vehicle and/or the vehicle runs, the system for providing the voice output service may acquire information of the driver and sense the state of the vehicle (using one or more sensors installed in the vehicle), may transmit the information of the driver and the information of the state of the vehicle to a cloud server, may share the information of the driver and the state of the vehicle with the cloud server, and may proactively generate a voice output service message appropriate to a current situation based on the shared information of the driver and the state of the vehicle. The system for providing the voice output service will be described below in more detail with reference to FIG. 2.

Figure 2:
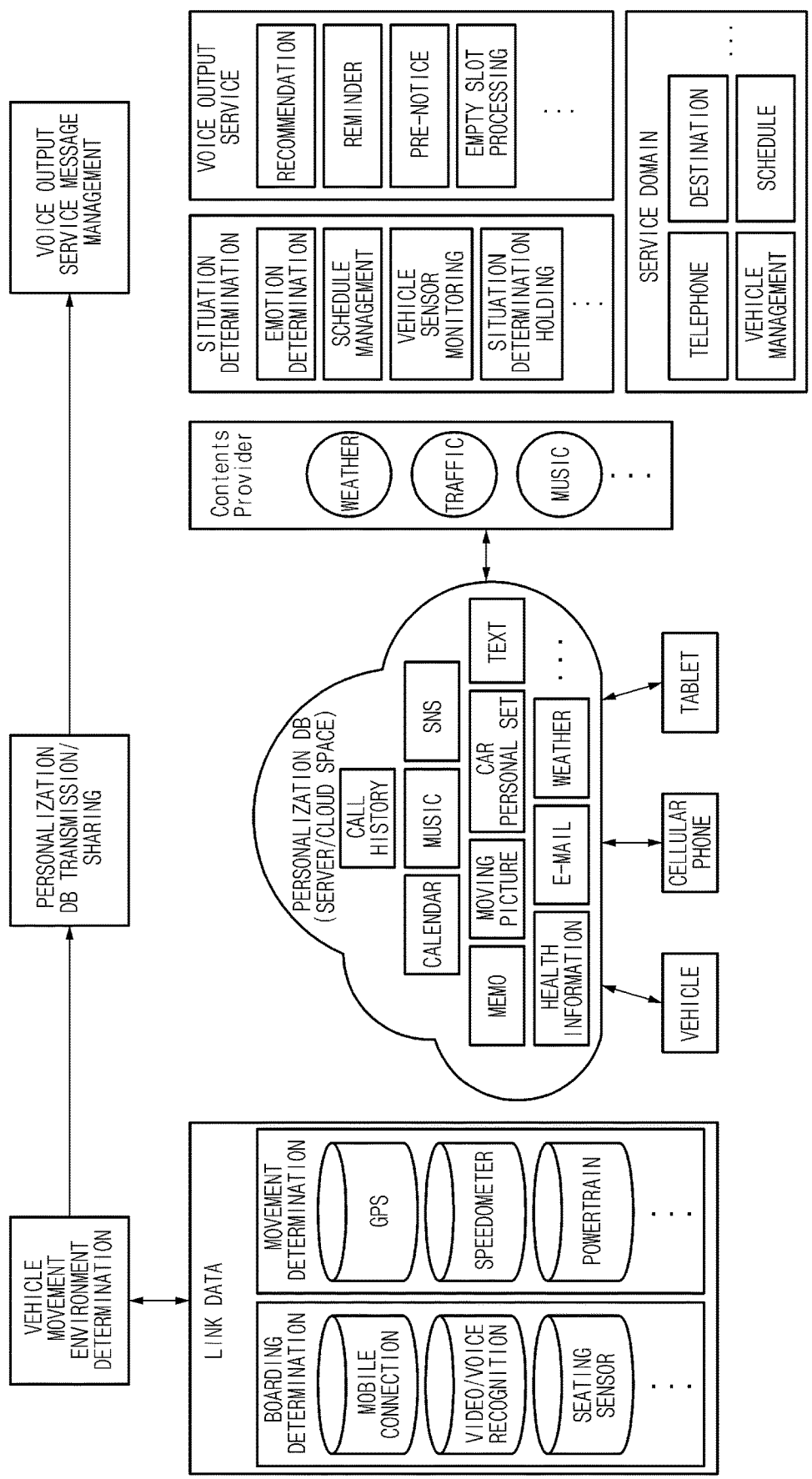

Referring to FIG. 2, according to embodiments of the present disclosure, the system for providing the voice output service may proactively determine a function to be recommended ("recommended function") for the driver and may acquire the information on the driver and sense the state of the vehicle to generate the voice output service message for informing the driver of the recommended function.

The information of the driver may be acquired from the vehicle and a personal device of the driver and may include, for example, the emotion of the driver, a call history, a calendar, music, social networking service (SNS), a note, a moving picture, an in-vehicle personal set information, a text, health information, an e-mail, and weather. In this case, the personal device may include a cell phone and a tablet personal computer (PC).

The state of the vehicle may include a driving state of the vehicle, the setting state of the vehicle, and the surrounding state of the vehicle. In this case, the setting state of the vehicle may include a refueling state or the state of consumables of the vehicle.

In addition, according to embodiments of the present disclosure, the system for providing the voice output service may detect whether the driver enters the vehicle and/or the vehicle runs. To detect whether the driver enters the vehicle, the following conditions may be determined.

Determination condition 1 for boarding state of driver: Connection between a communication device of the vehicle and a personal device of the user.

Determination condition 2 for boarding state of driver: Recognition of at least one of the facial image of a driver or the voice of the driver.

Determination condition 3 for boarding state of driver: Sensing boarding of driver by sensor provided in a driver seat of the vehicle.

It is detected that the driver enters the vehicle when at least one of condition 1 to condition 3 is satisfied.

To determine whether the vehicle runs, the following conditions may be determined.

Determination condition 1 for running state (or "driving state") of vehicle: Existence of Movement signal of vehicle.

Determination condition 2 for running state (or "driving state") of vehicle: Whether the speed of the vehicle exceeds a specific speed.

Determination condition 3 for running state (or "driving state") of vehicle: Control state of power train including engine and transmission.

It is determined that the vehicle runs when at least one of condition 1 to condition 3 is satisfied.

In addition, according to embodiments of the present disclosure, the system for providing the voice output service may transmit the information on the driver and the state of the vehicle to the cloud server and may share the information on the driver and the state of the vehicle with the cloud server. The personal device of the driver and an external contents provider may be connected with the cloud server through wireless communication.

The cloud server may be connected with the personal device and a personal database, which includes information on a call history, a calendar, music, an SNS, a note, a moving picture, an in-vehicle personal set information, health information, an e-mail, and weather, may be created in the cloud server. In addition, the cloud server may be connected with the contents provider to share information on weather, traffic, or music with the contents provider.

According to embodiments of the present disclosure, the system for providing the voice output service may generate the voice output service message for proactively determining and informing a recommended function to a driver, based on data stored and shared in the cloud server.

The voice output service message may be used, for example, to recommend music, to remind the driver of a schedule, or to previously inform the driver of vehicle consumables, based on the information of the driver and the state of the vehicle. In addition, the system for providing the voice output service may generate a message used for obtaining information, which is not ensured, when the situation is not exactly determined.

Figure 3:
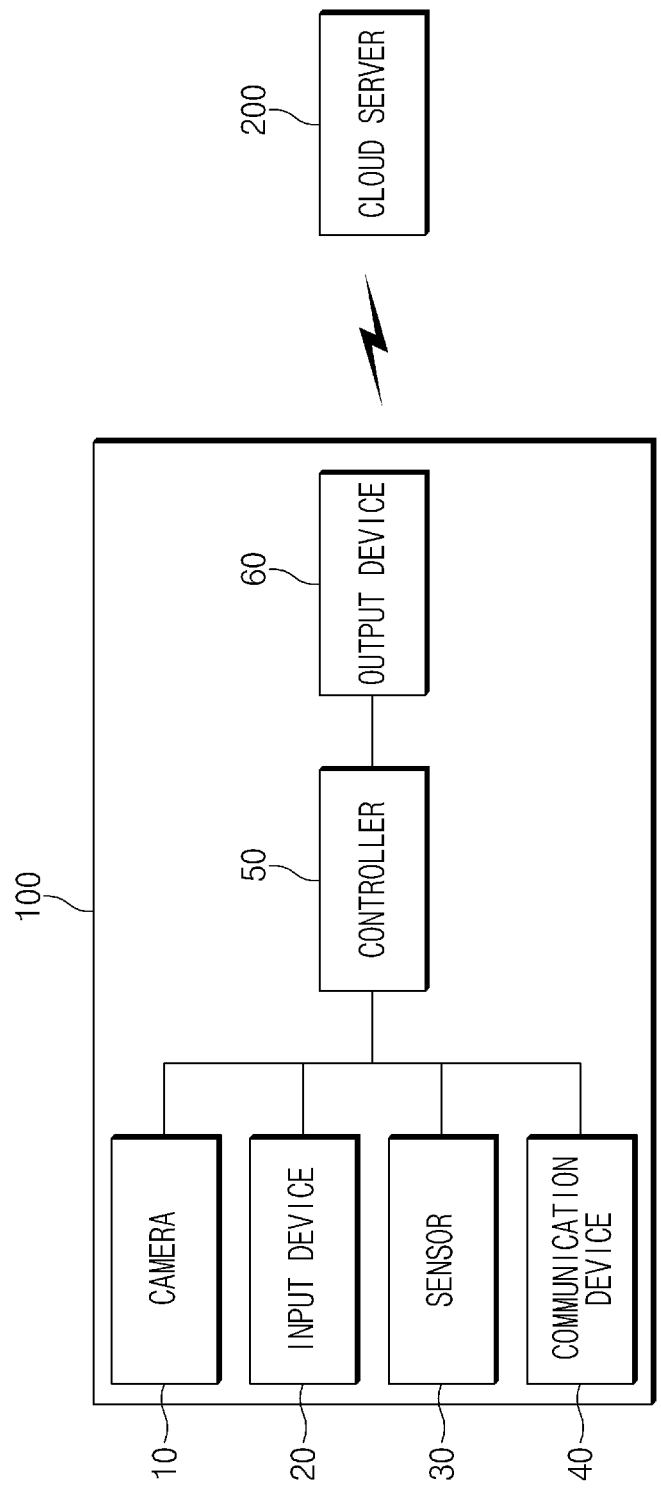
FIG. 3 is a block diagram illustrating the system for providing the voice output service, according to the present disclosure.

FIG. 3 is a schematic view illustrating the system for providing the voice output service, according to the present disclosure.

As illustrated in FIG. 3, according to the present disclosure, the system for providing the voice output service may include an apparatus 100 for providing the voice output service, which generates a voice output service message, and a cloud server 200 having the information on the driver and the state of the vehicle.

The apparatus 100 for providing the voice output service may include a camera 10, an input device 20, a sensor 30, a communication device 40, a controller 50, and an output device 60.

The camera 10 may include a camera module installed inside or outside the vehicle. The camera module installed inside the vehicle may capture the face of the driver and may obtain the information on the driver including the facial image of the driver. The camera module installed outside the vehicle may capture image information of surroundings closer to the vehicle as the vehicle runs and may obtain a surrounding state of the vehicle, which includes information on the traffic or the road outside the vehicle.

The input device 20 may include a microphone which recognizes the voice of the driver. The input device 20 may detect whether the driver enters the vehicle by recognizing the voice uttered by the driver.

The sensor 30 may be installed in a driver seat and may sense that the driver enters the vehicle. According to embodiments of the present disclosure, the sensor 30 may sense that the driver enters the vehicle by detecting vertical movement of a suspension in the driver seat.

In addition, the sensor 30 may sense the driving state of the vehicle, which is created through the operation of elements of the vehicle depending on the driving of the vehicle. The typical driving state may be sensed by using at least one of the speed of the vehicle, an rpm value, an acceleration, the control information of an accelerator pedal (e.g., the stepped depth or the stepped speed of the accelerator pedal), the control information of a foot brake pedal (e.g., the stepped depth or the stepped speed of the brake pedal), the control information of a clutch pedal (e.g., the stepped depth or the stepped speed of the clutch pedal), a gear shift stage number, and the position of a gear shift lever.

According to embodiments of the present disclosure, the sensor 30 may include a sensor that senses the operation of a pedal. The sensor 30 may sense a vehicle speed/acceleration/rapid over speeding/rapid deceleration/long-term over speeding and vehicle sudden braking/sudden departure. The sensor 30 may include a sensor which senses the operation of a steering wheel of the vehicle. The sensor 30 may sense a rapid turn or a rapid course-change. In addition, the sensor 30 may sense an incoming radio station, an odometer, the fuel level in a fuel tank, time, or a date.

Further, the sensor 30 may sense the location of the vehicle and the moving direction of the vehicle by using a global positioning system (GPS) provided in the vehicle.

In addition, the sensor 30 may sense bio-information of the driver. According to embodiments of the present disclosure, the sensor 30 may measure the heart rate of the driver by making contact with a part of the body of the driver.

The communication device 40 is connected with the personal device of the driver to wirelessly communicate with the personal device of the driver. The communication device 40 may transmit information collected in the vehicle to the cloud server 200. The communication device 40 may include a wireless Internet module for accessing the wireless Internet and a short-range communication module for short-range communication. For reference, the wireless Internet technology may include a wireless LAN (WLAN; Wi-Fi), a wireless broadband (Wibro), a $3^{rd}$ generation partnership project (3GPP), or a $4^{rd}$ generation partnership project (4GPP). The short-range communication technology may include Bluetooth, radio frequency identification (RFID), infrared data association (IrDA), ultra-wideband (UWB), or ZigBee.

The controller 50 may generate the voice output service message for actively determining and informing a function to be recommended to a driver, based on information obtained from the camera 10, the input device 20, and the sensor 30.

The controller 50 may generate a personal database in the cloud server 200 by sharing the information of the driver and the information of the state of the vehicle with the cloud server 200 through the wireless communication if it is determined that the driver enters the vehicle and/or the vehicle drives. The controller 50 may actively determine the function to be recommended to the driver by determining the information of the driver and the information of the state of the vehicle. To this end, the controller 50 may actively select a domain, based on the information on the driver and the state of the vehicle. According to embodiments of the present disclosure, the controller 50 may determine the state of the driver and the state of the vehicle, which may be varied during the driving of the vehicle after the driver has entered the vehicle, and decide a function recommendable to the driver, based on the determination. Accordingly, the recommendable function may be varied depending on the emotion of the driver, the schedule of the driver, or the state of the vehicle.

The controller 50 may generate the voice output service message for informing the recommendable function determined based on the information obtained from the input device 20 and the sensor 30, the information obtained from the personal device, and the information obtained from the external contents provider.

Figure 4:
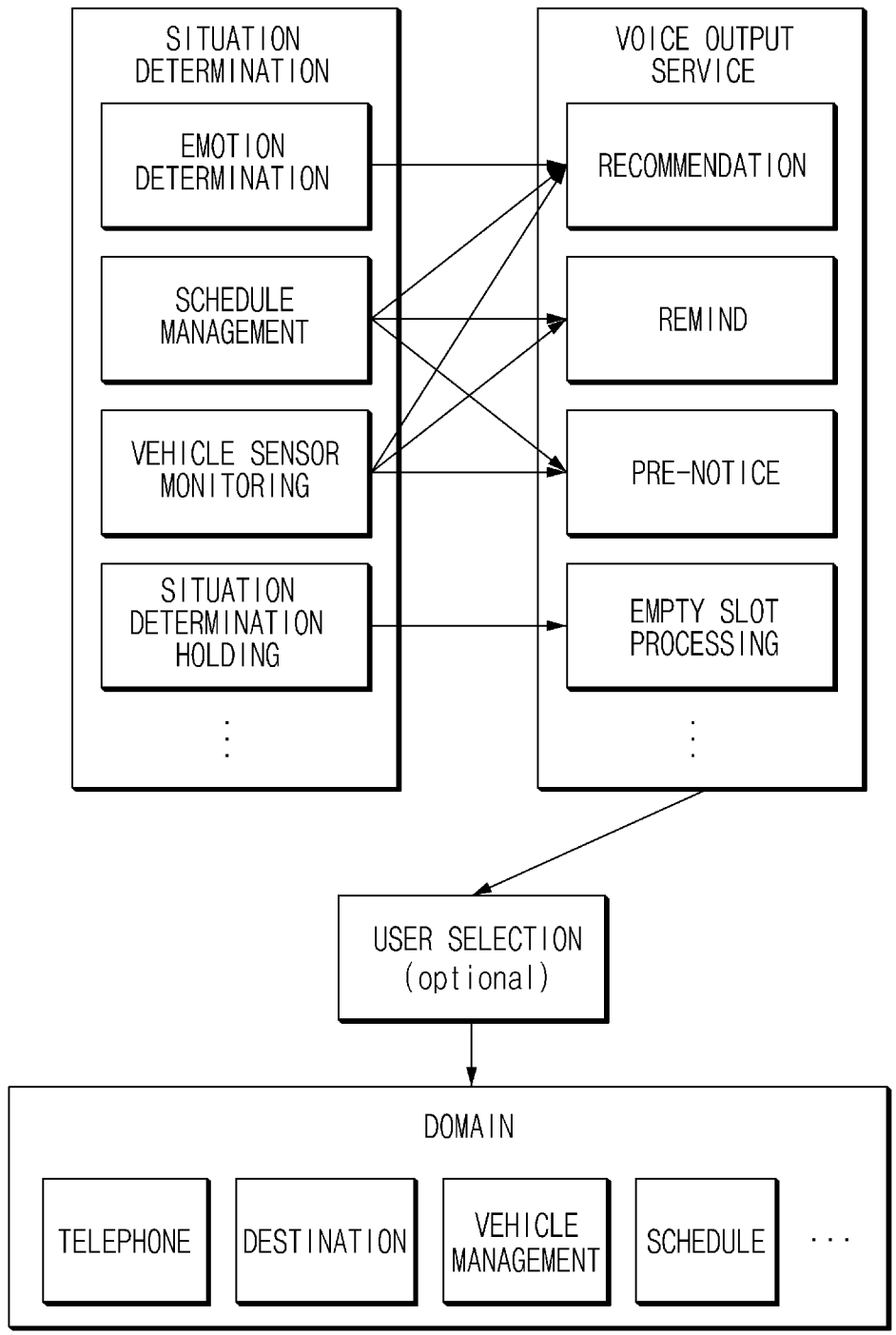
FIG. 4 is a view illustrating a voice output service provided for each situation, according to embodiments of the present disclosure.

For example, as illustrated in FIG. 4, the controller may determine the emotion of the driver based on the information of the driver and the state of the vehicle and thus may generate the voice output service message associated with "recommendation". According to embodiments of the present disclosure, the emotion of the driver may be determined based on the facial image of the driver obtained from the camera 10, the health information of the driver sensed from the sensor 30, the traffic situation around the vehicle, or the weather information obtained from the external contents provider. The controller 50 may generate a voice output service message for recommending the music and warning the carelessness of the driver by determining the emotion of the driver based on the above information.

In addition, the controller 50 may generate a voice output service message associated with "recommendation", "remind", or "pre-notice", based on the schedule stored in the vehicle and the personal device. According to embodiments of the present disclosure, the controller 50 may generate the voice output service message based on schedules, which are previously stored in the calendar and the note of the personal device, and weather information provided by the external contents provider. In this case, the schedule may include a meeting, an anniversary, an appointment, or a birthday. The controller 50 may generate the voice output service message for searching for and informing a place for the schedule or for informing the schedule in advance.

In addition, the controller 50 may generate a voice output service scenario related to "recommendation", "remind", or "pre-notice" based on the monitoring of the vehicle sensor. According to embodiments of the present disclosure, the controller 50 may generate a warning message of driving while maintaining a lane or may generate a voice output service message of informing the replacement of consumables, by monitoring the consumables, monitoring the lane, or sensing a refueling state or a front or rear surrounding.

In more detail, description will be made with reference to Tables 1 and 2 below regarding an operation that the controller 50 actively selects a domain to actively determine the function to be recommended to the driver and generates a voice output service message for informing the determined function. Table 1 shows information required for creating the voice output service message, and Table 2 shows a voice output service message created by using information described in Table 1.

TABLE 1

| Situation | Utilized Database | Voice Output Service Scenario | Domain |
| --- | --- | --- | --- |
| Emotion | Health Information, Traffic Situation, Schedule, Face Monitoring | Music Recommendation Warning Driver About Careless Driving | Media, Driving guide |
| Schedule | Calendar, Weather, Note | Destination Recommendation Schedule Information | Destination, Schedule |
| Vehicle Sensor | Lane Monitoring, Fuel Sensor, Front And Rear Sensors | Warning Driver About Careless Driving Replacement Of Consumables | Vehicle management |
| Determination Holding | Whole parts | Spacing (Empty Slot) | — |

TABLE 2

| Voice Output Service Scenario | Domain | voice output service message |
| --- | --- | --- |
| Music Recommendation | Media | Traffic is heavy, isn't it? I'll play exciting rock music. Today's stress is higher than usual, please listen to EDM and cheer up!! |
| Warning Driver About Careless Driving | Driving Guide, Destination | You look tired, stop driving for a while and take a break. Your blood glucose levels have increased more than usual, and I will guide you to the nearest pharmacy if you need to. |
| Destination Recommendation | Destination, Schedule Shopping | Today is your wife's birthday, should you buy a gift, May I show you to the nearest shopping mall? Congratulations on your wedding anniversary! I'll recommend a nice restaurant for dinner. |
| Schedule Information | Destination, Schedule, Date | You are scheduled to wash your vehicle today, it will rain in the afternoon, and do you want to change your vehicle wash reservation? Today, access to an apartment parking lot is restricted due to the maintenance work of the apartment parking lot. Please, park on the ground when you comes from your office. You are supposed to call Kim Youngsoo at 8 o'clock in the evening, I will call him?. |

TABLE 2-continued

| Voice Output Service Scenario | Domain | voice output service message |
| --- | --- | --- |
| Replacement Of Consumables | Vehicle Management | If you start now to Busan, tire pressure will be lower than the reference in about 2 hours. Fill air in advance. I think the fuel will drop on the way to Jeonju. Do you want to refuel at a nearby gas station and depart to Busan? |

For example, the controller 50 may determine the emotion of the driver depending on the result, which is obtained by monitoring the face of the driver based on the facial image, and the traffic situation. The controller 50 may select a media-related domain based on the emotion of the driver and may actively determine a function for music recommendation within the domain. The controller 50 may generate a voice output service message for providing the music recommendation. According to embodiments of the present disclosure, the controller 50 may generate a voice output service message of "Traffic is heavy, isn't it? I'll play exciting rock music" or "Today's stress is higher than usual, please listen to EDM and cheer up!!" The voice output service message may be output in the form of voice or an image through the output device 60.

In addition, the controller 50 may determine the emotion of the driver, based on the facial image of the driver and the bio-information of the driver. The controller 50 may select a domain associated with driving guide, based on the emotion of the driver and may actively determine a function to be recommended to the driver within the domain. In addition, the controller 50 may generate a voice output service message for informing the driver of the recommended function. According to embodiments of the present disclosure, the controller 50 may generate a voice output service message of "Your blood sugar level has increased more than usual, if you need me to take you to the nearest pharmacy?". In this case, the voice output service message may be created by allowing the driver to select whether the relevant function is provided for the driver. In addition, the controller 50 may inform the driver such that the driver selects the creation of the voice output service message. The voice output service message may be output in the form of voice or an image through the output device 60.

In addition, the controller 50 may determine the schedule of the driver based on the schedule stored in the personal device. The controller 50 may select a destination, a schedule, or a shopping-related domain based on the schedule of the driver and may actively determine the function of recommending the destination to the driver within the relevant domain. In addition, the controller 50 may generate a voice output service message for informing the recommendation of the destination. According to embodiments of the present disclosure, the controller 50 may generate the voice output service message of "Today is your wife's birthday. You have to buy gifts. May I guide you to a shopping mall nearby?". The controller 50 may generate the voice output service message of "May I guide you to a shopping mall nearby?". In this case, it can be understood that the created voice output service message allows the driver to personally select the guide to the nearby shopping mall or another service. Alternatively, the controller 50 may generate the voice output service message of "'Congratulations on your wedding anniversary, I'll recommend a nice restaurant for dinner". In this case, the controller 50 may generate the voice output service message by selecting a domain based on the schedule of the driver and by actively determining a function to be recommended to the driver. The voice output service message may be output in the form of voice or an image through the output device 60.

In addition, the controller 50 may determine the schedule of the driver and weather information obtained from the personal device and the external content provider. The controller 50 may select a destination, a schedule, or a weather-related domain, based on the schedule of the driver and the weather information and may actively determine a function for schedule guide from the relevant domain. In addition, the controller 50 may generate the voice output service message associated with the function for the schedule guide. According to embodiments of the present disclosure, the controller 50 may generate a voice output service message of "You are scheduled to wash the vehicle today, it will rain in the afternoon. Do you want to change the vehicle wash reservation?". In addition, the controller 50 may generate a voice output service message of "You're supposed to call Kim Youngsoo at 8 o'clock in the evening, shall I call him?". In this case, it may be understood that the voice output service message is created such that the driver personally selects the change of vehicle wash reservation or making a call. The voice output service message may be output in the form of voice or an image through the output device 60.

In addition, the controller 50 may determine the state of the vehicle sensed by the sensor. The controller 50 may select a domain associated with vehicle management and may actively determine a function of recommending the replacement of consumables in the relevant domain, based on the state of the car. In addition, the controller 50 may generate a voice output service message associated with this. According to embodiments of the present disclosure, the controller 50 may generate a voice output service message of "If you start now to Busan, tire pressure will be lower than the reference in about 2 hours. Fill air in advance, or I think the fuel will drop on the way to Jeonju. Do you want to refuel at a nearby gas station and depart to Busan?". In this case, it can be understood that the voice output service message is created such that the driver personally selects the refueling of the vehicle. The voice output service message may be output in the form of voice or an image through the output device 50.

Meanwhile, the controller 50 may determine whether reference information is obtained to generate the voice output service message. If the reference information is not obtained, the controller 50 may generate the voice output service message for obtaining information. In other words, if the reference information is not obtained, the controller 50 may determine a present state to be a holding state for generating the voice output service message and may generate the voice output service message for obtaining the reference information. The details thereof will be described with reference to Table 3. Table 3 is a table in which requirement information for generating a driver voice output service message. The information of Table 3 may be obtained from the camera 10, the input device 20, and the sensor 30, may be obtained from the personal device, and may be obtained from an external contents provider. In Table 3, "( )" refers to that the requirement information for creating the voice output service message is not obtained. Referring to Table 3 below, it may be understood that information, such as an age, a gender, a GPS, a music genre, or a visit frequency time, is not obtained.

TABLE 3

| Situation | Information (F1) | Information (F2) | Information (F3) | Information (F4) | Information (F5) | Information (F6) |
|---|---|---|---|---|---|---|
| Emotion (S1) | (Age) | (Gender) | Stress | Traffic situation | Face expression | |
| Schedule (S2) | Anniversary | Note | Weather | | | |
| Vehicle sensor (S3) | TPMS | Speedometer | (GPS) | Front/rear detection | Refueling | Lane monitoring |
| Preference (S4) | (Music genre) | Radio Channel | DMB channel | | | |
| Driving pattern (S5) | Lane compliance rate | Rapid acceleration ratio | Emergency stop Ratio | Inertia driving | | |
| Path (S6) | Frequency of visits | (Visit frequency time) | Registration point | | | |

The controller 50 may generate a voice output service trigger condition table using the information of Table 3. The voice output service trigger condition table may show reference information for creating a voice output service message based on the information on the driver and the state of the vehicle stored in the cloud server. The details thereof will be described with reference to Table 4 below. Table 4 shows the voice output service trigger condition table. The information in the voice output service trigger condition table may include information obtained from the vehicle and the personal device and information obtained from the external content provider.

TABLE 4

| Voice Output Service Scenario | Voice Output Service Field | Reference Information | Hold |
|---|---|---|---|
| Recommendation | Media | S1F3, S1F4, S1F5, (S4F1) | ○ |
| | PLACE | S2F1, S2F2 | |
| Remind | Schedule | S2F1, S2F2 | |
| | Destination | S2F1, S2F2 | |
| Pre-Notice | Consumables | S3F1, S3F3, S3F5 | ○ |

Regarding, for example, "recommendation" in the scenario in Table 4, S1F3, S1F4, S1F5, and S4F1 are required as reference information in the voice output service field of "media" for "recommendation", which is the voice output service scenario, However, it may be recognized that the information of S4F1 is not acquired since S4F1 has parentheses. In the state that the reference information is not completely obtained, the voice output service message associated with "recommendation" may not be generated. When this state is maintained for a predetermined period, the generation of the voice output service message associated with "recommendation" is designated as "hold". In this case, the controller 50 may acquire information of S4F1 by generating the voice output service message for acquiring the information. The voice output service message for acquiring the information may include content for acquiring the reference information.

For example, the controller 50 may generate a voice output service message of "'When you are stressed due to traffic jam like today, I'm going to make you listen to your favorite music, which genre do you like?" for obtaining information to obtain the information of S4F1 and may output the voice output service message in the form of a voice or an image through the output device 60. When the favorite genre of the driver is answered as "Modern Rock" to the voice output service message for obtaining the information, the controller 50 may recognize the information of S4F1 as "Modern Rock". When the information of S4F1 is obtained, the controller 50 determines that reference information is obtained and may generate a voice output service message of "I'll make you listen to music in your favorite genre".

Additionally, as illustrated in Table 5 below, the controller 50 may generate a voice output service scenario to obtain the information in parentheses in Table 3.

TABLE 5

| Voice output service scenario | Domain | Voice output service message for obtaining information, |
|---|---|---|
| Voice output service trigger condition table. Obtain reference information | Media | I want to make you listen to your favorite music, which kind of genre do you like?" |
| | Health care | Age and sex are required for accurate stress measurement. Can you tell me those? |
| | Destination | Do you want to set a place where you arrive every morning to your workplace? |

Referring to Table 5, to obtain information of (music genre) in Table 3, the controller 50 may actively generate a voice output service message for obtaining the information within a media-related. According to an embodiment, the controller 50 may generate the voice output service message of "'I'd like to make you listen to your favorite music, which kind of genre do you like?" The voice output service message for obtaining the information may be output in the form of voice or an image through the output device 60.

In addition, to obtain information of (age) or (gender) in Table 3, the controller 50 may actively generate the voice output service message for obtaining information in the health-care-related domain. According to embodiments of the present disclosure, the controller 50 may generate the voice output service message of "Age and sex are required for accurate stress measurement. Can you tell me those?". The voice output service message may be output in the form of voice or an image through the output device 60.

In addition, to obtain information of (GPS) or (visit frequency time) in Table 3, the controller 50 may generate a voice output service message for acquiring information in the destination-related domain. According to embodiments of the present disclosure, the controller 50 may generate a voice output service message of "Do you want to set a place where you arrive every morning to your workplace?" for acquiring information. The voice output service message for acquiring the information may be output in the form of voice or an image through the output device 60.

In this manner, when the generation for the voice output service message fails due to insufficiency in the information of the driver and the information associated with the state of the vehicle, the controller 50 may obtain the information by generating the voice output service message for acquiring the information.

The cloud server 200 may store a database having the information of the driver and the information associated with the state of the vehicle which are obtained from the vehicle and the personal device. The cloud server 200 may make wireless communication with the vehicle and the personal device and may receive information on a call history, a calendar, music, an SNS, a note, a moving picture, an in-vehicle personal set information, a text, health information, an e-mail, and weather through the wireless communication. In addition, the cloud server 200 may be synchronized with a contents provider in real time and may share information on weather, traffic, or music, which is included in contents, with the contents provider. In addition, the state of the vehicle and a setting value may be shared with the cloud server 200.

Figure 5:
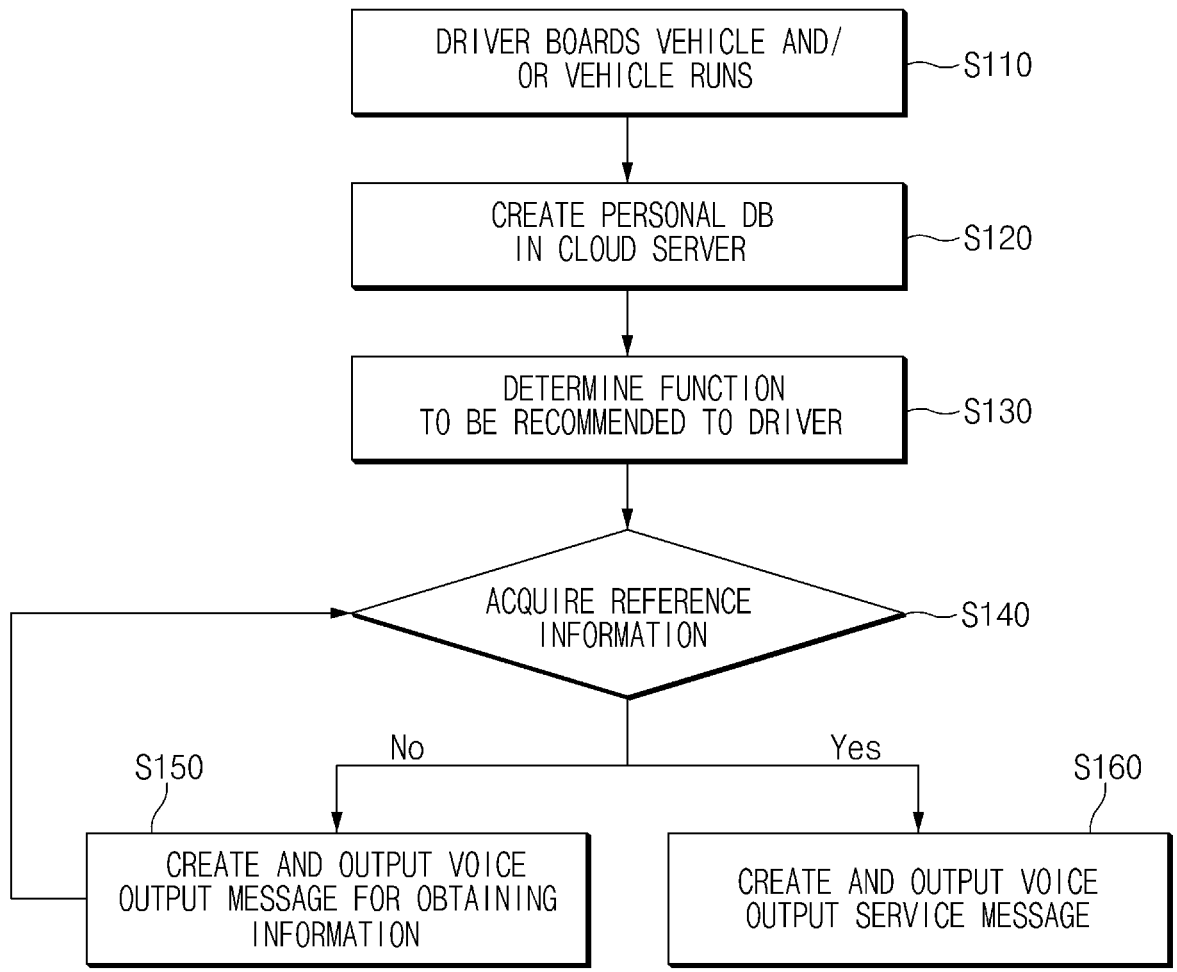
FIG. 5 is a flowchart illustrating a method for providing a voice output service, according to the present disclosure.

FIG. 5 is a flowchart illustrating a method of providing a voice output service, according to the present disclosure.

As illustrated in FIG. 5, the controller 50 detects whether the driver enters the vehicle and/or the vehicle runs (S110). In operation S110, the controller 50 determines whether the vehicle is connected with the personal device of the driver, whether at least one of the facial image of the driver or the voice of the driver is recognized, and whether a sensor provided in the driver seat senses the boarding of the driver, thereby detecting whether the driver enters the vehicle. In addition, the controller 50 may determine whether there is present a GPS movement signal of the vehicle, and whether the speed of the vehicle exceeds a specific speed, and weather the power train including the engine and the transmission is controlled, thereby determining the running state (or "driving state") of the vehicle. In operation S110, the information on the driver may be obtained from the camera provided in the vehicle and the personal device, the setting state of the vehicle and the surrounding state of the vehicle is sensed by the sensor provided in the vehicle, thereby obtaining the information on the state of the vehicle.

If it is detected that the driver has entered the vehicle and/or the vehicle runs in operation S110, the information on the driver and the information related to the state of the vehicle are transmitted to the cloud server and synchronized, and a personal database is created in the cloud server (S120). The cloud server may be synchronized with the external contents provider and may share the information of the external contents provider with the external contents provider. Operation S120 may be performed through wireless communication such as WiFi or Bluetooth.

The controller 50 may actively determine a function to be recommended to the driver based on the information on the driver and the state of the vehicle synchronized with those of the cloud server (S130). The controller 50 may select a domain based on the information on the driver and the state of the vehicle to actively determine the function to be recommended to the driver in operation S130.

The controller 50 determines whether reference information for generating a voice output service message is obtained after selecting the domain and determining the recommended function to be recommended to the driver (S140). Operation S140 is to determine whether the reference information is acquired for actively selecting the domain based on the information on the driver and the state of the vehicle which are stored in the cloud server or the information on the contents provider, for determining the recommended function within the domain, or for creating the voice output service message for informing the determined function.

A voice output service message for acquiring the information is created and output to obtain the reference information (S150) if the reference information is not obtained (No) in operation S140. Operation 150 may be performed when the generation of a voice output service message is determined to be in a holding state as the execution of operation S160 is determined to be insufficient. The voice output service message for acquiring the information may be actively created until the reference information is acquired.

Meanwhile, if the reference information is acquired in operation S140, the voice output service message is created and output (S160). In operation S160 may generate the voice output service message for providing the recommended function determined in operation S130.

Figure 6:
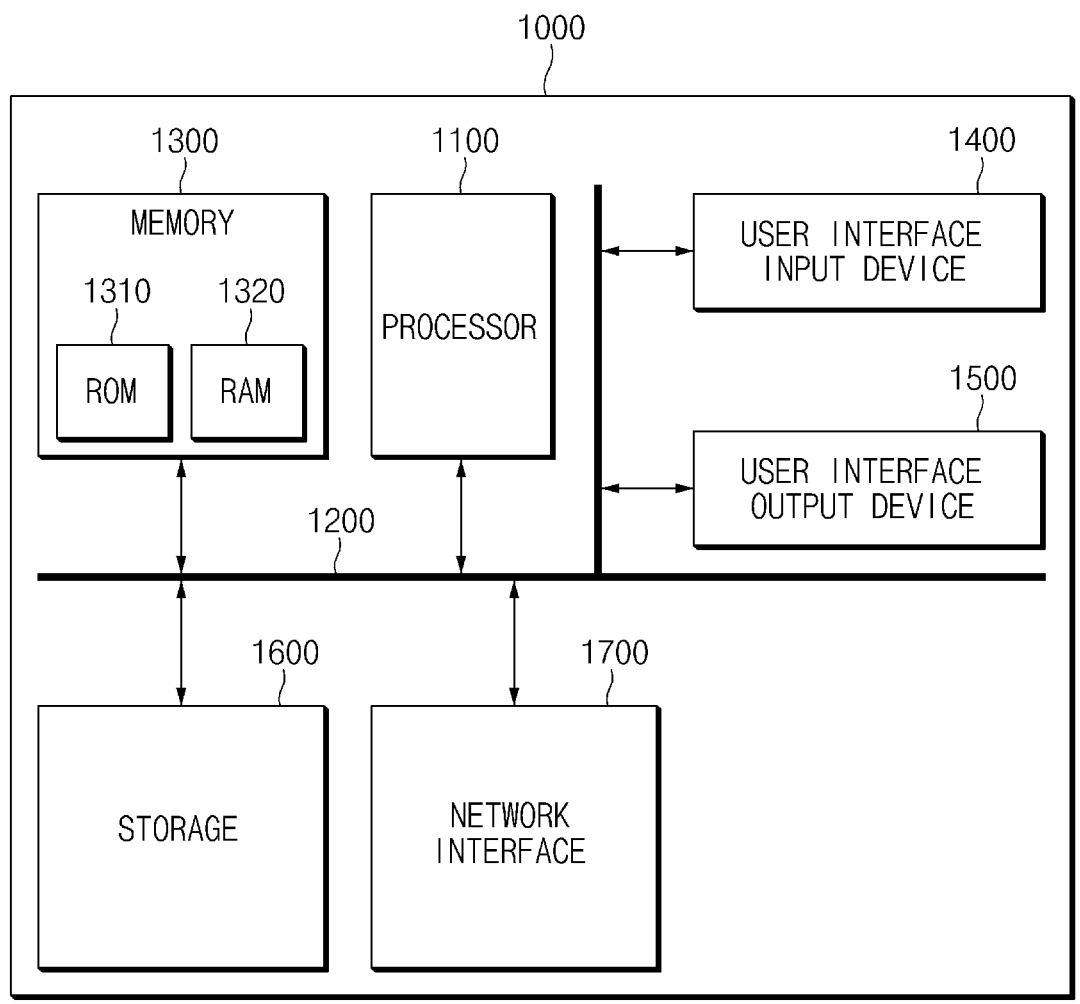
FIG. 6 is a block diagram illustrating a computing system to execute the method according to embodiments of the present disclosure.

FIG. 6 is a block diagram illustrating a computing system to execute the method according to recommended.

As shown in FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to the present disclosure, even though the driver does not request content, a function useful to the driver may be proactively determined by determining a situation of the driver and generating the voice output message resulting from the determined recommended function. In addition, when an appropriate voice output service message is generated, even if the information for generating the voice output service message is insufficient, required information may be actively collected and the content of the voice output service message may be compiled.

Hereinabove, although the present disclosure has been described with reference to certain embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for providing a voice output service in a vehicle, the apparatus comprising:
a controller configured to detect whether a driver enters the vehicle, determine a recommended function for the driver based on information of the driver and information of a state of the vehicle when it is detected that the driver enters the vehicle, and generate at least one of a voice output service message corresponding to the driver of the recommended function based on a reference information or a voice output service message for obtaining a reference information depending on whether the reference information for generating the voice output service message is acquired; and
an output device configured to output the generated voice output service message.

2. The apparatus of claim 1, further comprising:
a camera configured to capture a facial image of the driver and a surrounding image of the vehicle.

3. The apparatus of claim 1, further comprising:
a sensor configured to sense the state of the vehicle.

4. The apparatus of claim 1, wherein the controller is further configured to detect that the driver enters the vehicle when a communication device of the vehicle is connected with a personal device of the driver.

5. The apparatus of claim 1, wherein the controller is further configured to detect that the driver enters the vehicle when at least one of a facial image of the driver or a voice of the driver is recognized.

6. The apparatus of claim 1, wherein the controller is further configured to share the information of the driver and the information of the state of the vehicle with a cloud server.

7. The apparatus of claim 1, wherein the controller is further configured to:
select a domain using the information of the driver and the information of the state of the vehicle;
generate the voice output service message within the domain; and
determine whether reference information for generating the voice output service message is acquired.

8. The apparatus of claim 7, wherein the controller is further configured to generate the voice output service message when the reference information for generating the voice output service message is acquired.

9. The apparatus of claim 7, wherein the controller is further configured to generate a message for obtaining the reference information when the reference information for generating the voice output service message is not acquired.

10. A method for providing a voice output service in a vehicle, the method comprising:
   detecting whether a driver enters the vehicle;
   determining a recommended function for the driver based on information of the driver and information of a state of the vehicle when it is detected that the driver enters the vehicle;
   generating at least one of a voice output service message corresponding to the driver of the recommended function based on a reference information or a voice output service message for obtaining a reference information depending on whether the reference information for generating the voice output service message is acquired; and
   outputting the generated voice output service message.

11. The method of claim 10, wherein the detecting of whether the driver enters the vehicle includes:
   detecting that the driver enters the vehicle when a communication device of the vehicle is connected with a personal device of the driver.

12. The method of claim 10, wherein the detecting of whether the driver gets in the vehicle includes:
   detecting that the driver enters the vehicle when at least one of a facial image of the driver or a voice of the driver is recognized.

13. The method of claim 10, wherein the detecting of whether the driver gets in the vehicle includes:
   acquiring the information of the driver; and
   sensing the state of the vehicle using a sensor.

14. The method of claim 13, wherein the acquiring of the information of the driver includes:
   acquiring the information of the driver from a camera provided in the vehicle and a personal device of the driver connected with a communication device of the vehicle.

15. The method of claim 13, wherein the sensing of the state of the vehicle includes:
   sensing a driving state of the vehicle, a setting state of the vehicle, and a surrounding state of the vehicle.

16. The method of claim 10, wherein the determining of the recommended function includes:
   selecting a domain based on the information of the driver and the information of the state of the vehicle.

17. The method of claim 16, wherein the generating of the voice output service message includes:
   determining whether a requirement information reference value for generating the voice output service message within the domain is acquired.

18. The method of claim 17, wherein the generating of the voice output service message further includes:
   generating the voice output service message when the requirement information reference value for generating the voice output service message is acquired.

19. The method of claim 17, wherein the generating of the voice output service message further includes:
   generating a message for obtaining information when the requirement information reference value for generating the voice output service message is not acquired.

20. A system comprising:
   an apparatus for providing a voice output service in a vehicle; and
   a cloud server in communication with the apparatus,
   wherein the apparatus includes:
      a controller configured to detect whether a driver enters the vehicle, determine a recommended function for the driver based on information of the driver and information of a state of the vehicle, which are shared with the cloud server, when it is detected that the driver enters the vehicle, and generate at least one of a voice output service message corresponding to the driver of the recommended function based on a reference information or a voice output service message for obtaining a reference information depending on whether the reference information for generating the voice output service message is acquired; and
      an output device configured to output the generated voice output service message.

* * * * *